Oct. 7, 1969 R. W. HARMON 3,471,628
OIL-FILLED CABLE TERMINAL WITH CONDUCTIVE, ELASTOMERIC STRESS CONE
Filed Nov. 15, 1967 3 Sheets-Sheet 1

INVENTOR.
ROBERT W. HARMON
BY
ATTORNEY

Oct. 7, 1969   R. W. HARMON   3,471,628
OIL-FILLED CABLE TERMINAL WITH CONDUCTIVE, ELASTOMERIC STRESS CONE
Filed Nov. 15, 1967   3 Sheets-Sheet 2

INVENTOR.
ROBERT W. HARMON
BY
ATTORNEY

Oct. 7, 1969 R. W. HARMON 3,471,628
OIL-FILLED CABLE TERMINAL WITH CONDUCTIVE, ELASTOMERIC STRESS CONE
Filed Nov. 15, 1967 3 Sheets-Sheet 3

INVENTOR.
ROBERT W. HARMON
BY
ATTORNEY

United States Patent Office 3,471,628
Patented Oct. 7, 1969

3,471,628
OIL-FILLED CABLE TERMINAL WITH CONDUCTIVE, ELASTOMERIC STRESS CONE
Robert W. Harmon, Doylestown, Ohio, assignor to The Ohio Brass Company, Mansfield, Ohio, a corporation of New Jersey
Filed Nov. 15, 1967, Ser. No. 683,290
Int. Cl. H02g 15/26
U.S. Cl. 174—12
13 Claims

ABSTRACT OF THE DISCLOSURE

This patent discloses a cable terminal for use with solid dielectric cable systems in which sealing, electric stress control, and relief of thermal expanion and contraction are provided by insulating oil and a stress cone made of conductive elastomeric material.

---

This invention relates to cable terminals and, particularly, to cable terminals for solid dielectric cables such as are used in electric power systems.

The principal object of the invention is to provide improved cable terminals for cables employing solid dielectrics, the terminals being adapted for substantially complete assembly during manufacture and for installation with a minimum of manual operations.

The development of plastic materials suitable for insulating electric conductors at high voltages has resulted in the development of solid dielectric cables for electric power systems; these cables are useful over a wide range of voltages. Inasmuch as terminating apparatus for solid dielectric cables presents substantially the same problems as the corresponding apparatus for cables having oil and paper dielectric systems operating at high voltages, the cost of installing terminal devices constitutes to some extent a limitation upon the adoption of cable systems for low voltage systems. Various cable terminals proposed for this purpose involve compromise of performance in order to reduce the cost of the terminal device.

The present invention relates to a new cable terminal for solid dielectric cables in which improved results are afforded by an insulator of solid insulating material, such as porcelain, epoxy resin, or the like, for supporting the terminal conductor, a body of insulating oil such as silicone for stress, moisture, and contamination control, and a flexible diaphragm of conductive elastomeric material which functions as a stress cone for distributing electric stresses and to permit thermal relief expansion and contraction of the insulating oil and other parts of the insulator without development of undue stresses.

The invention will be understood by reference to the following detailed specification and claims, taken in connection with the appended drawings in which:

Figure 1:
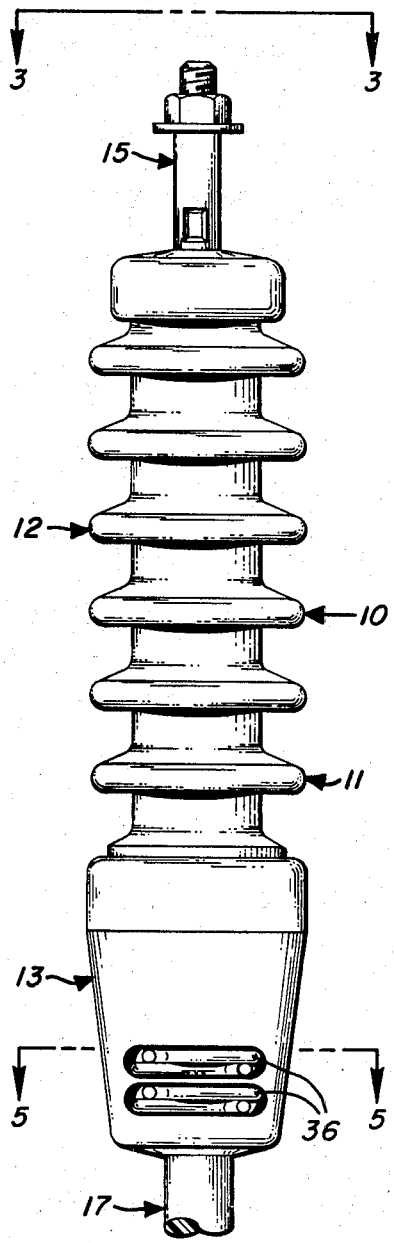
FIG. 1 is an exterior elevation view of a cable terminal constructed in accordance with the invention.
Figure 2:
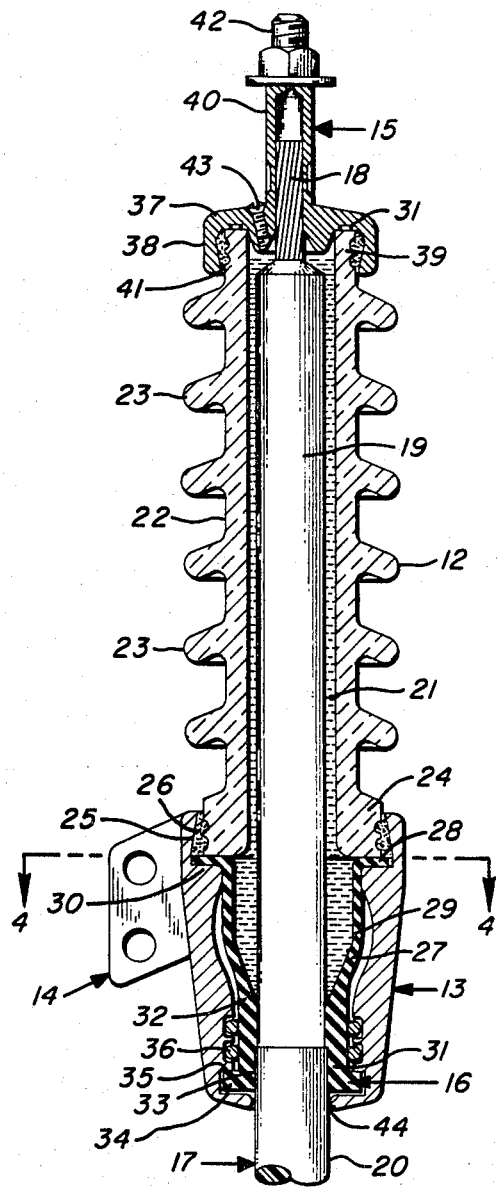
FIG. 2 is a longitudinal sectional view of the cable terminal of FIG. 1.
Figure 3:
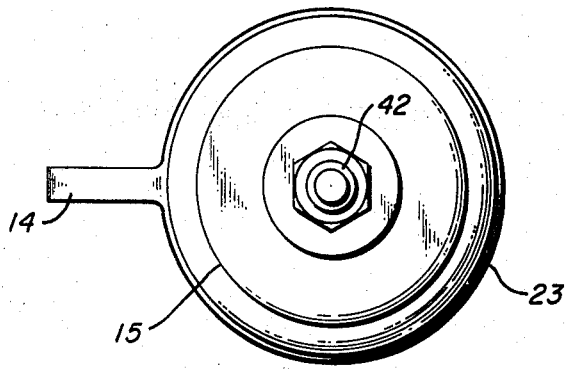
FIG. 3 is an end view of the cable terminal, taken in the direction 3—3 in FIG. 1.
Figure 4:
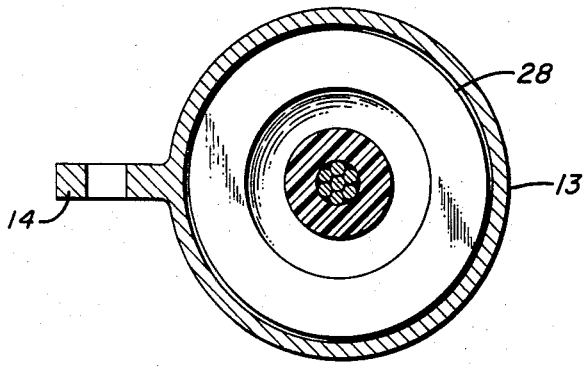
FIG. 4 is a transverse sectional view taken on line 4—4 in FIG. 2.

Referring now to FIGURES 1 and 2, the terminal device 10 comprises a housing 11 constituted by an insulator 12 and a base 13, a support bracket 14, a terminal conductor 15, and a terminal jacket 16. The terminal device 10 is adapted to receive a cable 17 comprising a conductor 18, insulation 19, and jacket 20, and a body of insulating oil 21 in the space between the cable 17 and the insulator 12, a terminal connector 15, and terminal jacket 16.

The cable 17 is of known design, generally referred to as a solid dielectric cable, in which the insulation 19 and jacket 20 are composed of a plastic material, comprising a polymer having elastic and electrically insulating properties, for example a cross-linked polyethylene, and manufactured by a continuous forming process. The plastic material of the jacket 20 incorporates a structured carbon-black or similar material, usually as a semi-conductor, which is distributed more or less uniformly through the material to impart a suitable conductivity characteristic to the material, so that the jacket constitutes a conducting sheath for the cable. The jacket is electrically separated from the conductor 18 by the insulation 19, and the conductor 18 constitutes the sole energized load-carrying conductor of the cable. Cables of this design are ordinarily incorporated in single-phase systems having one or two conductor cables or three-phase systems having three conductor cables and a separate ground wire or armor wire sheath (not shown herein).

The insulator 12 comprises an elongated tubular body 22 made of porcelain, glass, or an organic insulating material such as epoxy resin, and having integral flanges 23 which function as weathersheds and surface-distance-leakage means for increasing the electrical length of the exterior of the insulator. The lower end of the body 22 comprises an enlarged wall section 24 which is received in an opening 25 at the top end of the base 13. The part is secured to the base 13 by a bond 26 of portland cement, epoxy resin, or like bonding material, in the opening 25 between the base 13 and the wall section 24, so that the insulator 12 is carried in fixed relation to the base 13 and the support 14.

The terminal jacket 16 comprises an elongated tubular diaphragm 27 of conductive rubber with its upper extremity comprising an end flange 28 formed at right angles to the body 29 to engage the shoulder 30 of the base 13. The lower end portion 31 of the diaphragm is formed with a part 32 which engages the exterior surface of the insulation 19, a part 33 which engages the exterior surface of the jacket 20, and a part 34 which engages a shoulder 35 on the interior of the base 13.

The end flange 28 of the diaphragm is compressed between the shoulder 30 of the base and the end face of the insulator end part 24 to constitute a fluid seal between the terminal jacket 16 and the body 22. Other sealing arrangements may be utilized, particularly in structures using mechanical clamping means instead of the bond 26.

Figure 5:
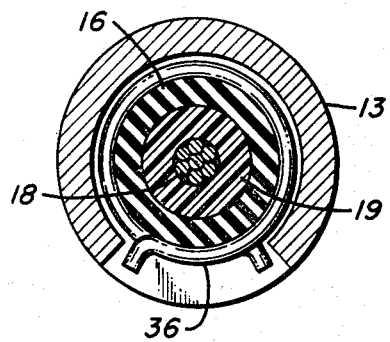
FIG. 5 is a sectional view of the base, taken on line 5—5 in FIG. 1, illustrating a method of clamping the jacket terminal to the cable.

The end portion 31 of the diaphragm 27 is secured to the cable 17 by means such as spring wire clips 36 which extend circumferentially about the exterior thereof and elastically compress the parts 32 and 33 of the diaphragm into electroconductive engagement with the exterior surfaces of the insulation 19 and jacket 20. Access to the clips 36 is provided by openings in the side wall of the base 13, shown in FIG. 1 and FIG. 5. Screw clamps and other devices may be utilized instead of wire clips, conformable to the design of the base 13.

The diaphragm 27 is constructed of rubber or neoprene or other elastomer which incorporates a conducting material similar to the cable jacket 20, so that the entire diaphragm is electrically conductive and constitutes a continuation of the jacket 20 from the end of the jacket to the insulator 12. As so constituted, the diaphragm 27 functions as an electric stress distributing means, or stress cone according to the terminology of the art, for determining the electric stress distribution about the conductor 18 and in the inulation 19 and oil 21 within the diaphragm. Additionally, the diaphragm functions as a relief means for accommodating thermal expansion and contraction of the insulating oil 21 and differential thermal expansion and contraction of the cable 17 with respect to the housing.

The diaphragm may be made of type W neoprene rubber or butyl rubber with a filler, such as a structured carbon black, for imparting a resistivity characteristic of the order of 1,000 ohm-cms., for example, ASTM type designation SC 515 Z (manufactured by) Karman Rubber Company, Copley, Ohio.

The terminal connector 15 comprises a circular metal part 37 having an annular shoulder 38 extending longitudinally over the upper end 39 of the body 22 and a central tubular portion 40 extending longitudinally away from the body 22. The part 37 is secured to the body 22 by a bond 41 of portland cement or epoxy resin, similar to the bond 26, between the shoulder 38 and the end part 39. The central tubular portion 40 has an interior opening for receiving the conductor 18 and is adapted to be crimped into mechanical and electroconductive engagement with the conductor 18 without breaking the seal between the connector 15 and the body 22. The outer end 42 of the portion 40 is provided with suitable fastener means for attaching an electric conductor. The part 37 is formed with an opening for introducing the oil 21 into the interior of the insulator 12 during the installation of the terminal device and a filler plug 43 for closing the opening after installation is complete.

The oil 21 comprises an oil particularly designed for use as an electrical insulating oil, for example a silicone oil such as Dow-Corning 200 or 710 insulating oil manufactured by the Dow-Corning Corporation, Midland, Mich. The oil preferably has a density greater than that of water so that water and other contaminants will float to the upper end of the housing.

The terminal device 10, comprising the insulator 12, the base 13, the support 14, the connector 15, the terminal jacket 16, and the clips 36, is assembled during manufacture and the oil is separately packaged and in a form convenient for insertion through the opening in the part 37. The clips are held in expanded or open condition by clamps (not shown) until installation. Suitable precautions are taken for maintaining the interior of the device free from contaminant materials, particularly a seal for the opening 44 at the lower extremity of the base 13 which receives the cable 17.

In installation, the cable 17 is prepared by removal of the insulation from the end portion of the conductor 18 that projects into the connector 15 and removal of the jacket 20 from the insulation 19 for a suitable distance corresponding to the length of the device between the connector 15 and the terminal jacket 16, as indicated in the drawing. The cable is then inserted through the terminal jacket 16 and the insulator 12, and the conductor 18 is inserted intothe tubular portion 40 of the connector 15. The portion 40 is then crimped upon the conductor 18 to form the necessary electrical and mechanical connection with the conductor, and the clips 36 are released by removing the clamps which hold the clips in normally open position during shipment. The clips 36 then secure the parts 32 and 33 aof the terminal jacket 16 in firm engagement with the cable insulation 19 and cable jacket 20. It is important that a fluid tight seal be made with the insulation 19 or the jacket 20 or both and that an elecrically conductive joint be made between the diaphragm and the jacket 20. The filler plug 43 is removed and the insulating oil is forced through the filler opening into the interior of the housing, and the opening is closed by inserting the filler plug 43. The cable and terminal are then ready for use.

The space between the diaphragm 27 and the base 13 permits movement of the diaphragm to accommodate changes in volume of the oil 21 due to changes in temperature and is vented to the exterior atmosphere through the opening 44. The diaphragm also permits differential thermal expansion to take place between the cable and the cable terminal.

Figure 6:
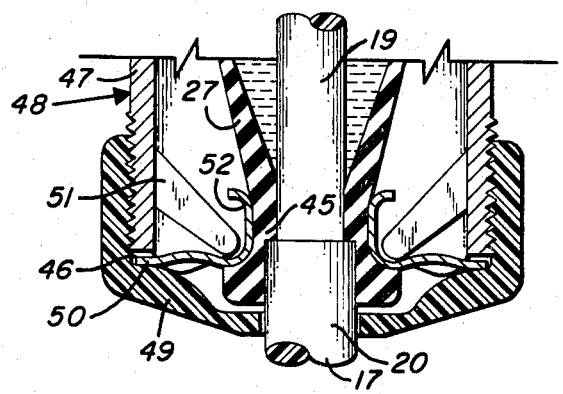
FIG. 6 shows an alternate method and spring clamp for securing the jacket terminal to the cable.

In the lower end construction shown in FIG. 6, the lower end part 45 of the diaphragm 27 is compressed upon the insulation 19 and jacket 20 of the cable 17 by an annular cluster spring 46, which extends peripherally about the end part 45 in contact with the exterior surface and has the radially outward extremity thereof aligned with the wall 47 of a base 48. A cap 49 is threaded on the exterior of the wall 47 and draws the radial portion 50 of the cluster spring toward the wall 47, causing the spring to pivot about an interior abutment 51 and the longitudinal part 52 of the spring to force the end part 45 of the diaphragm into engagement with the cable 17.

Figure 7:
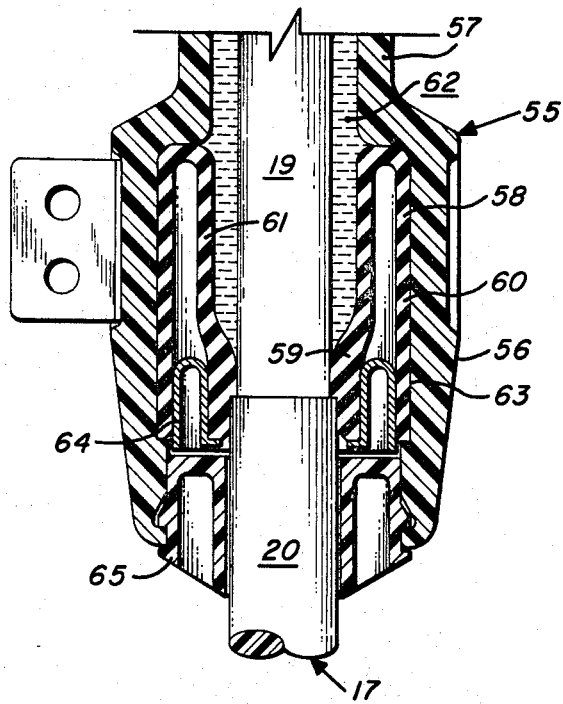
FIG. 7 shows an alternate form of lower end construction for the cable terminal.

In the terminal device 55, shown in FIG. 7, the housing is constituted as a single piece, the base 56 being integral with the insulator 57. The construction is particularly adapted for use with epoxy resins and like materials.

The terminal jacket in this modification of the invention is formed as an annular diaphragm 58 of conductive rubber or neoprene having a U-shaped cross section with the interior lower end part 59 having a shape similar to that of the end portion 31 of the terminal jacket 16. The part 59 engages the insulation 19 and jacket 20 of the cable 17 and is carried from an outer part 60 by an inner wall 61 which is spaced about the insulation 19 in alignment with the interior opening of the insulator 57 for receiving the insulating oil 62. The outer part 60 is received in a recess 63 in the interior of the base 56, and the diaphragm maintained in position and the part 59 maintained in engagement with the cable 17 by a spring insert 64 which is positioned between the two radially spaced parts of the diaphragm. An annular plastic insert 65 is received in the space between the cable and the lower extremity of the base 56 for closing the base 56 after the cable is installed in the terminal device. The terminal device 55 is in other respects similar to the terminal device 10.

The inner wall 61 of the diaphragm 58 is aligned with the inner wall of the insulator 57 to minimize the quantity of insulating oil and to minimize wall movement with changes in temperature.

In all forms of invention disclosed herein the diaphragm is shaped for conductive engagement with the jacket 20 of the cable to constitute an electrical continuation of the jacket, and is shaped for smooth separation from the insulation 19 to provide uniform distribution of electrical stresses in the space between the diaphragm and the cable insulation. The insulating oil comprises a homogenous insulating and dielectric medium without voids so that there is no possibility of corona formation. Moreover, the oil performs an essential function as a seal for the interior of the housing and for the cable insulation, preventing corona, tracking, and deterioration of the insulation generally. Although not critical, it is desirable to utilize the terminal with a limited range of sizes of the cable in order to minimize the quantity of insulating oil to limit the excursions of the diaphragm during temperature changes. However, the terminal is adapted and intended for use with a variety of sizes of cable.

In connecting the diaphragm 27 to the cable jacket 20, various known forms of screw clamps having means for producing a uniform compression of the diaphragm upon the jacket may be utilized instead of the spring clips 36. It is important that an electrically conductive joint and a fluid-tight seal be made between the diaphragm and the jacket or armor of the cable.

I claim:
1. In an electric cable system, a cable comprising a central conductor, solid insulation, and a surrounding jacket of conductive plastic material and, in combination therewith, a cable terminal comprising a housing constituted by a tubular insulator having a central longitudinal opening and a base coaxial with the insulator secured to one extremity thereof, the cable having the insulated portion of the conductor received in the housing, a terminal connector at the other extremity of the insulator in sealed engagement therewith and constituting a fluid closure for the interior of the housing, the conductor of the cable attached to the connector, and an elongate tubular diaphragm of conductive elastomeric material disposed within the base and comprising a closure for the interior of the housing, said diaphragm being in electroconductive engagement with the end of the jacket of the cable and in tangential engagement with a portion of the surface of the insulation of the cable and spaced from the insulation of the cable along a portion thereof, means for clamping said portions to the jacket and the insulation of the cable, respectively, and a body of electrical oil within said housing in contact with the interior of the housing, the interior of the diaphragm and exterior of the cable insulation, the said diaphragm functioning to distribute electric stresses in the oil and cable insulation for corona and stress control thereof.

2. A cable system in accordance with claim 1, in which the outward extremity of the diaphragm has a stepped configuration providing conductive engagement with the jacket of the cable and tangential engagement with the insulation of the cable, the diaphragm and the contained body of oil determining a substantial uniform distribution of stresses within the diaphragm.

3. A cable system in accordance with claim 1, in which the contained body of oil has a density greater than that of water for maintaining the interior of the housing and diaphragm in a substantially contaminant-free condition.

4. A cable terminal adapted to receive an electric cable of the type having a central conductor, surrounding solid insulation and a conductive jacket, the terminal comprising a housing adapted to be filled with insulating oil and the housing comprising a tubular insulator having a longitudinal opening, a terminal connector secured to one extremity of the insulator and constituting a fluid closure for one end of the housing, said connector having a part adapted to receive the conductor of the cable in electroconductive engagement therewith, a base at the other extremity of the insulator, and a flexible tubular diaphragm of conductive material supported within the base and surrounding the cable, said diaphragm constituting a closure for the other end of the housing and being adapted to accommodate thermal expansion of the insulating oil, a fluid seal of greater diameter than the cable between the diaphragm and the housing, the end portion of the diaphragm being adapted to make a fluid tight seal with the cable and having a part adapted to have electroconductive engagement with the conductive jacket, the diaphragm having a portion adapted to surround the cable insulation in a zone where the conductive jacket has been stripped therefrom and being of gradually increasing diameter in a direction toward the opposite end of the housing to provide for distribution of electrical stresses in the space between the cable insulation and the diaphragm.

5. A cable terminal according to claim 4, in which there is a space between the exterior of the diaphragm and the base for accommodating movement of the diaphragm and a vent from the said space to the atmosphere.

6. A cable terminal according to claim 4, in which the diaphragm has a U-shaped cross section, the exterior cylindric portion thereof being engaged with and positioned by the base, the interior cylindric portion thereof being adapted to engage the cable at the free end thereof, with the portion away from the free end spaced from the cable to contain the insulating oil and to define a stress cone, and the interior space between the two cylindric portions accommodating movement of the said interior portion.

7. A cable terminal according to claim 4 in which the base and the insulator are separately formed and the diaphragm has a portion that is engaged between an end face of the insulator and a shoulder on the base to provide the seal between the diaphragm and the housing.

8. A cable terminal according to claim 4 in which the base is formed integrally with the insulator.

9. A cable terminal according to claim 4, in which the part of the terminal connector adapted to receive the conductor of the cable extends longitudinally away from the insulator and has a thin wall adapted for connection with the conductor by crimping.

10. A cable terminal according to claim 4 having means for clamping the said end portion of the diaphragm against the conductive jacket of the cable.

11. A cable terminal according to claim 10 having means for clamping said end portion of the diaphragm against the cable insulation in a zone where the conductive jacket has been stripped therefrom.

12. A cable terminal according to claim 10 wherein the base is provided with an aperture to provide access to the clamping means.

13. A cable terminal adapted to receive an electric cable of the type having a central conductor, surrounding solid insulation and a conductive jacket, the terminal comprising a housing adapted to be filled with insulating oil and the housing comprising a tubular insulator having a central longitudinal opening, a terminal connector secured to one extremity of the insulator and constituting a fluid closure for one end of the housing, said connector having a part adapted to receive the conductor of the cable in electroconductive engagement therewith, a base at the other extremity of the insulator, and an elongated flexible tubular diaphragm of conductive material supported within the base, said diaphragm constituting a closure for the other end of the interior of the housing, means providing a fluid seal between the diaphragm and the housing, the end portion of the diaphragm remote from the insulator having a part adapted to surround the exterior surface of the insulation of the cable in a zone from which the conductive jacket has been stripped and a part adapted to have electroconductive engagement with the conductive jacket, and at least one of said parts of the diaphragm being adapted to make a fluid tight seal with the cable.

References Cited
UNITED STATES PATENTS 2,050,888   8/1936   Kirch _____ 174—19 X
3,290,428  12/1966  Yonkers _____ 174—73

LARAMIE E. ASKIN, Primary Examiner

U.S. Cl. X.R.

174—19, 73